United States Patent
Kanesaka et al.

[19]

[11] Patent Number: 5,804,148
[45] Date of Patent: Sep. 8, 1998

[54] ENGINE EXHAUST PURIFIER

[75] Inventors: Hiroyuki Kanesaka, Narita; Yasuyuki Murofushi, Yokohama, both of Japan

[73] Assignee: Nissan Motor Co., Ltd., Kanagawa, Japan

[21] Appl. No.: 819,181

[22] Filed: Mar. 17, 1997

[30] Foreign Application Priority Data

Mar. 22, 1996 [JP] Japan .................................. 8-065683

[51] Int. Cl.$^6$ ....................................................... F01N 3/10
[52] U.S. Cl. ........................... 422/174; 422/171; 422/177; 422/180; 422/199; 422/211; 422/222; 422/109; 60/284; 60/297; 60/300
[58] Field of Search .................................. 422/171, 177, 422/180, 174, 199, 222, 211, 109; 60/297, 300, 301, 288, 284

[56] References Cited

U.S. PATENT DOCUMENTS

| | | | |
|---|---|---|---|
| 5,296,198 | 3/1994 | Abe et al. .................................. | 422/174 |
| 5,315,824 | 5/1994 | Takeshima ................................. | 422/174 |
| 5,422,082 | 6/1995 | Yoshizaki et al. ....................... | 422/174 |
| 5,529,043 | 6/1996 | Nagaishi et al. ......................... | 123/478 |
| 5,634,331 | 6/1997 | Aoki et al. ................................. | 60/297 |

FOREIGN PATENT DOCUMENTS

| | | |
|---|---|---|
| 5-59942 | 3/1993 | Japan . |
| 5-115793 | 5/1993 | Japan . |
| 5-168950 | 7/1993 | Japan . |
| 6-142457 | 5/1994 | Japan . |
| 7-247829 | 9/1995 | Japan . |

*Primary Examiner*—Hien Tran
*Attorney, Agent, or Firm*—McDermott, Will & Emery

[57] ABSTRACT

An HC adsorbent which adsorbs hydrocarbons in a predetermined low temperature region and discharges hydrocarbons in a temperature region higher than the lower temperature region is provided in an engine exhaust passage. A catalyst which oxidizes hydrocarbons in a predetermined high temperature region is provided downstream of the HC adsorbent. A heater for heating exhaust is provided upstream of the HC adsorbent. A control unit activates the heater when the exhaust temperature has risen to near the upper limit of the lower temperature region. Activation of the catalyst is thereby promoted, and the time until the catalyst starts oxidizing hydrocarbons discharged by the HC adsorbent is shortened.

16 Claims, 5 Drawing Sheets

ENGINE EXHAUST PURIFIER

FIELD OF THE INVENTION

This invention relates to purification of exhaust from an engine using a plurality of catalysts.

BACKGROUND OF THE INVENTION

An exhaust purifier for purifying hydrocarbons (HC) contained in the exhaust of an engine during a cold start is disclosed for example in Tokkai Hei 5-59942 published by the Japanese Office in 1993. The purifier comprises an HC adsorbent where zeolite is the main component disposed upstream of a three-way catalytic converter in an exhaust passage of the engine. This HC adsorbent adsorbs HC at low temperature, and discharges HC when a fixed temperature (e.g. 90° C.) is exceeded.

In this purifier, therefore, HC is absorbed by the HC adsorbent before the three-way catalytic converter reaches its activation temperature. When the exhaust temperature is above the activation temperature of a three-way catalyst, e.g. 300° C., in the three-way catalytic converter, the HC adsorbed in the HC adsorbent is discharged and oxidized by the three-way catalytic converter.

Another catalyst is also provided in the upstream of the HC adsorbent. This catalyst increases the efficiency of HC adsorption by the HC adsorbent during the cold start, because the exhaust heat during the cold start is primarily used to increase the temperature of the upstream catalyst, the temperature rise of the HC adsorbent is delayed and the temperature condition under which it can adsorb HC is therefore lengthened.

However, the activation temperature of the three-way catalyst is approx. 300° C. whereas the temperature at which HC starts to leave the HC adsorbent is approx. 90° C.

Accordingly while the exhaust temperature is rising from 90° C. to 300° C., HC which is discharged by the HC adsorption material cannot be purified by the downstream three-way catalytic converter, and a considerable amount of unpurified HC is discharged to the atmosphere.

Consequently, HC purifying efficiency during a cold start is still limited using this purifier.

A similar exhaust purifier using an HC adsorbent is also disclosed in Tokkai Hei 6-142457 published by the Japanese Patent Office in 1994.

SUMMARY OF THE INVENTION

It is therefore an object of this invention to further reduce an HC discharge amount during cold start of an engine.

It is a further object of this invent on to increase HC adsorption efficiency of an HC adsorbent.

In order to achieve the above objects, this invention provides an exhaust purifier provided in an exhaust passage of an engine for purifying exhaust from the engine. The purifier comprises an adsorbent disposed in the exhaust passage which adsorbs hydrocarbons in a predetermined low temperature region and discharges adsorbed hydrocarbon in a temperature region higher than the low temperature region, a first catalyst disposed in the exhaust passage downstream from the adsorbent, this first catalyst oxidizing hydrocarbons in a predetermined high temperature region higher than the low temperature region, a mechanism for heating exhaust in the exhaust passage, the heating means being disposed in the exhaust passage upstream from the adsorbent, and a mechanism for activating the heating mechanism when an exhaust temperature has risen near to an upper limit of the low temperature region.

It is preferable that the purifier further comprises a second catalyst disposed in the exhaust passage between the heating mechanism and the adsorbent, this second catalyst oxidizing hydrocarbons in a predetermined high temperature region higher than the low temperature region.

It is also preferable that the p further comprises a second catalyst disposed in the exhaust passage downstream from the first catalyst, this second catalyst oxidizing hydrocarbons in a predetermined high temperature region higher than the low temperature region.

It is also preferable that the activating mechanism comprises a mechanism for computing a target time period from engine startup to when the heating mechanism begins heating based on a hydrocarbon adsorption capacity of the adsorbent, a mechanism for measuring a time elapsed from engine startup, and a mechanism for activating the heating mechanism when the time elapsed from engine startup coincides with the target time period.

It is also preferable that the heating mechanism varies a generated heat amount according to a supplied current.

In this case, it is further preferable that the activating mechanism further comprises a mechanism for computing a target value of the current based on a hydrocarbon adsorption capacity of the adsorbent, and a mechanism for supplying current to the heating mechanism corresponding to the target value.

It is still further preferable that the activating mechanism further comprises a mechanism for varying the hydrocarbon adsorption capacity based on an inlet temperature of the adsorbent.

It is still further preferable that the activating mechanism further comprises a mechanism for estimating the inlet temperature from a cooling water temperature of the engine.

It is also preferable that the heating mechanism comprises a honeycomb structure formed by laminating alternate layers of flat and corrugated thin metal band, and electrodes disposed in e center and on the outer circumference of the structure.

It is also preferable that the adsorbent comprises a honeycomb type substrate coated with a slurry having zeolite powder.

This invention also provides an exhaust purifier comprising an adsorbent disposed in the exhaust passage which adsorbs hydrocarbons in a predetermined low temperature region and discharges adsorbed hydrocarbons in a temperature region higher than the low temperature region, this adsorbent having a catalyst function for oxidizing hydrocarbons in predetermined high temperature region higher than the low temperature region, a mechanism for heating exhaust in the exhaust passage, this heating means being disposed in the exhaust passage upstream from the adsorbent, and a mechanism for activating the heating mechanism when an exhaust temperature has risen near to an upper limit of the low temperature region.

It is preferable that the purifier further comprises a catalyst disposed in the exhaust passage between the heating mechanism and the adsorbent, this catalyst oxidizing hydrocarbons in a predetermined high temperature region higher than the low temperature region.

It is also preferable that the purifier further comprises a catalyst disposed in the exhaust passage downstream from the adsorbent, this catalyst oxidizing hydrocarbons in a predetermined high temperature region higher than the low temperature region.

It is also preferable that the activating mechanism comprises a mechanism for computing a target time period from engine startup to when the heating mechanism begins heating based on a hydrocarbon adsorption capacity of the adsorbent, a mechanism for measuring a time elapsed from engine startup, and a mechanism for activating the heating mechanism when the time elapsed from engine startup coincides with the target time period.

It is also preferable that the heating mechanism varies a generated heat amount according to a supplied current.

In this case, it is further preferable that the activating mechanism further comprises a mechanism for computing target value of the current based on a hydrocarbon adsorption capacity of the adsorbent, and a mechanism for supplying current to the heating mechanism corresponding to the target value.

It is still further preferable that the activating mechanism further comprises a mechanism for varying the hydrocarbon adsorption capacity based on an inlet temperature of the adsorbent.

It is still further preferable that the activating mechanism further comprises a mechanism for estimating the inlet temperature from a cooling water temperature of the engine.

It is also preferable that the heating mechanism comprises a honeycomb structure formed by laminating alternate layers of flat and corrugated thin metal band, and electrodes disposed in the center and on the outer circumference of the structure.

It is also preferable that the adsorbent comprises a honeycomb type substrate coated with a slurry having zeolite powder.

The details as well as other features and advantages of this invention are set forth in the remainder of the specification and are shown in the accompanying drawings.

DESCRIPTION OF THE PREFERRED EMBODIMENTS

Figure 1:
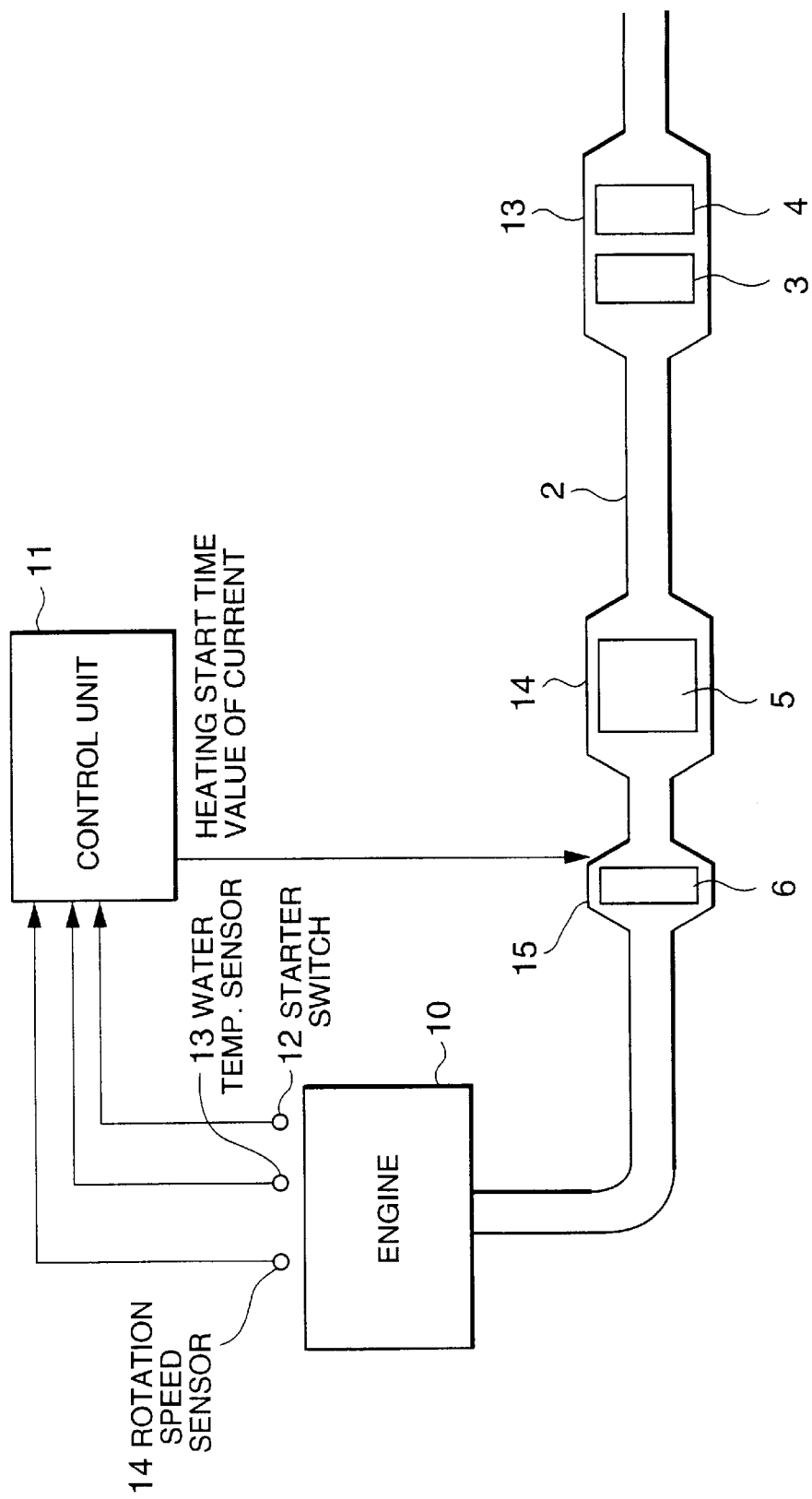
FIG. 1 is a schematic diagram of an exhaust purifier according to a first embodiment of this invention.

Referring to FIG. 1 of the drawings, catalytic converter 13 is provided in an exhaust passage 2 of a vehicle engine 10 underneath the floor of the vehicle.

This catalytic converter 13 comprises an HC adsorbent 3 arranged upstream and a first three-way catalyst 4 arranged downstream in an identical housing. An oxidizing catalyst may b e used instead of the first three-way catalyst 4.

A second converter 14 containing a second three-way catalyst 5 is provided upstream of the catalytic converter 13 in the exhaust passage 2. Another converter 15 containing a catalyst on an electrical heating substrate 6 is also provided upstream of the converter 14.

The HC adsorbent 3 absorbs HC at low converter inlet temperatures up to approx. 90° C., and discharges the adsorbed HC at higher temperatures.

Herein, the HC adsorbent 3 comprises a slurry having zeolite as its main component coated on a honeycomb substrate.

Specifically, the HC adsorbent 3 was obtained as described below.

100 weight parts of USY zeolite containing $SiO_2/Al_2O_3$ in a mole ratio of 50, 65 weight parts of silica gel containing 20% solids and 65 weight parts of water were introduced in a ball mill and crushed for 6.5 hours so as to make a slurry.

The slurry obtained was coated on a monolithic honeycomb substrate of 400-cell per square inch and 1.3 liter in volume, and after drying, was precalcinated in air at 400° C. for 1 hour.

The slurry was applied in 3 stages.

First, 60 g/liter was applied as a post-precalcination amount. Two similar applications were made so that the total of each post-precalcination amount was 150 g/liter.

After the above process, final calcination was performed at 650° C. for 4 hours.

When the temperature of the inlet of the HC adsorbent 3 is fixed, the HC saturation adsorption amount is uniquely determined by the zeolite type and amount used in the material.

This saturation adsorption amount varies depending on the inlet temperature. It should be noted that the saturation adsorption amount is equal to the HC adsorption capacity later.

The three-way catalysts 4 and 5 may be ordinary catalysts containing one or more of the metals platinum (Pt), palladium (Pd) or rhodium (Rh). The two three-way catalysts 4 and 5 may be identical, or the catalyst 4 may for example be a Pt/Rh catalyst, and the catalyst 5 may be a Pd catalyst. Alternatively, both of the catalysts 4 and 5 may be Pt/Rh catalysts, and the amount of noble metals in them may be varied.

For example, using a Pt/Rh catalyst wherein Pt/Rh=5/1, the application amount in the catalyst 4 may be 1.4 liter and the application amount in the catalyst 5 maybe 2.8 g/liter.

The HC adsorbent 3 is such that HC is adsorbed at low temperature, and HC is released when a temperature of approx. 90° C. is exceeded.

In this exhaust purifier, as in the prior art, exhaust heat during a cold start is used to increase the temperature of the second three-way catalyst 5 situated upstream of the HC adsorbent 3 so as to delay temperature rise of the HC adsorbent 3 and lengthen the HC adsorption time.

The HC released from the HC adsorbent due to temperature rise is oxidized together with the HC in the engine exhaust at that time by the first three-way catalyst 4 as in the prior art.

In this engine 10, a control unit 11 performs feedback control of the air-fuel ratio.

The control unit 11 is a microcomputer which for example comprises a CPU, RAM, ROM and I/O interface. The control unit 11 increases the fuel amount to make the air-fuel ratio rich without performing feedback control of the air-fuel ratio during cold start of the engine 10, and shifts to air-fuel ratio feedback control when the water temperature of the engine 10 has reached a certain level. An $O_2$ sensor, not shown, for detecting the oxygen concentration of engine exhaust is provided for this purpose upstream of the first three-way catalyst 4, and air-fuel ratio feedback control starts when the control unit 11 determines that the $O_2$ sensor has become active from the output of the $O_2$ sensor. This type of air-fuel ratio control is known for example from U.S. Pat. No. 5,529,043.

In general, the time required for the $O_2$ sensor to become active is generally shorter than the time required for the three-way catalyst 4 to become active, so air-fuel ratio feedback control starts before the exhaust temperature reaches approx. 300° C. which is the activation temperature of the three-way catalyst 4.

Although the downstream three-way catalytic converter 4 oxidizes and purifies HC discharged by the HC adsorbent 3, the HC conversion efficiency of the first three-way catalyst 4 is low until the catalyst 4 reaches its activation temperature of approx. 300° C., and part of the HC which remains unconverted is discharged to the atmosphere.

To deal with this problem, according to this invention the converter 15 containing the electrical heating substrate 6 is provided upstream of the second catalytic converter 14.

This electrical heating substrate 6 is formed by alternate layers of flat and corrugated thin metal band, which are then laminated to give a honeycomb structure. This structure is such that its length in the exhaust flow direction from the center to the outer circumference gradually decreases. Electrodes are disposed in the center and on the outer circumference of the structure, and the structure is heated by passing a current through these electrodes. Materials which form the aforementioned three-way catalyst or oxidizing catalyst are coated on the substrate 6.

This type of substrate 6 is known from Tokkai Hei 5-115793 published by the Japanese Patent Office in 1993. In this substrate 6, the number of electrical current paths at the center and on the outer circumference of the substrate 6 is almost the same, so a uniform resistance heat pattern is obtained and the temperature distribution in the interior of the structure is rendered uniform.

The control unit 11, by energizing this substrate 6 so as to heat the exhaust and rapidly increase exhaust temperature immediately before the HC adsorbent 3 loses its adsorbing ability, thereby accelerates temperature rise of the three-way catalysts to promote its activation. To perform this heating control of the exhaust, signals are input to the control unit 11 from a starter switch 12 which detects startup of the engine 10, a water temperature sensor 13 which detects a cooling water temperature WTRS of the engine 10, and a rotation speed sensor 14 which detects the engine rotation speed Ne.

Next, the exhaust heating control performed by the control unit 11 via the substrate 6 will be described with reference to the flowchart of FIG. 2.

This flowchart shows a process for computing the timing of the start of heating i.e. the time period from engine startup to the start of heating of the substrate 6, and the value of the current supplied to the substrate 6. This process is executed once during engine startup.

In a step S1, a determination of a flag STF is performed. This flag STF is a flag for determining whether the engine starter motor is ON or OFF, and it is set according to a signal from the starter switch 12. When STF=0, the starter motor is OFF.

When STF=0 in the step S1, it is determined that the engine has been started, and the routine proceeds to a step S2.

In the step S2, a water temperature determination value WTES for determining whether or not the engine is starting cold is found from the cooling water temperature WTRS detected by the water temperature sensor 13 from the following equation:

$$WTES = WTCAK \cdot WTRS$$

where, WTCAK is a coefficient representative of the location of the HC adsorbent, which takes a larger value the shorter the distance form the engine to the adsorbent.

In a step S3, this water temperature determining value WTES is compared with a predetermined temperature value HCLT. When WTES<HCLT, it is determined that the engine is starting cold, and the routine proceeds to a step S4. In the step S4, the adsorption capacity (saturation adsorption amount) HCCA of the HC adsorbent 3 is obtained by looking up a predetermined HCCA table from the inlet temperature T of the HC adsorbent 3. The inlet temperature T of the HC adsorbent 3 is estimated from the cooling water temperature WTRS by considering the drop in exhaust temperature due to the position of the HC adsorbent 3 in the exhaust passage 2.

For this purpose, a map specifying the relation between the cooling water temperature WTRS and inlet temperature T under various running conditions is first drawn up by experiment, and this table is stored in the control unit 11.

In the step S4, the inlet temperature T of the HC adsorbent 3 is found by looking up this map from the cooling water temperature WTRS, and the adsorption capacity HCCA is also found by looking up the HCCA table.

If the cooling water temperature WTRS is used only for the determination of cold startup and the inlet temperature T is directly detected by a temperature sensor, e.g., thermocouple, the computation precision is enhanced.

When the inlet temperature T of the HC adsorbent 3 is constant, the adsorption capacity HCCA is determined by the specification and volume of the HC adsorbent 3, while on the other hand the adsorption capacity HCCA varies according to the inlet temperature T, and it decreases the higher the inlet temperature T.

In a step S5, this adsorption capacity HCCA is divided by a coefficient EHCTK determined by the performance and capacity of the electrical heating substrate 6, and an energizing start time (heating start time) EHCST is found by adding a constant HCTC to this value.

When the performance of the electrical heating substrate 6 is poor, the heating start time must be advanced and the value of the coefficient EHCTK increases. The constant HCTC is a value used to set the energizing start time when the adsorption capacity of the HC adsorbent 3 is 0, and it is a larger value than 0.

In a step S6, a current value EHCCV supplied to the electrical heating substrate 6 is calculated from the adsorption capacity HCCA. In a similar calculation to that used to find the energizing start time EHCST, the current value EHCCV is found by dividing the adsorption capacity HCCA by a coefficient EHCCK determined by the temperature rise and resistance characteristics of the electrical heating substrate 6, and adding a constant HCCC to the result.

When the temperature rise characteristics of the electrical heating substrate 6 are poor, it is necessary to pass a large current through it, so the value of the coefficient EHCCK is small. Also since a large current must be passed to generate the same amount of heat the lower the resistance value of the substrate 6 the value of the coefficient EHCCK is then smaller. The constant HCCC is a value for setting the current supplied to the substrate 6 when the adsorption capacity of the adsorbent 3 is 0, and it is larger than 0.

In a step S7, a flag EHCSTF is set to "1". This flag EHCSTF specifies whether to start energization or prohibit energization of the substrate 6. When EHCSTF=1, energizing of the. heater 6 is permitted.

When on the other hand it is determined in the step S1 that the engine starter motor is still rotating, or when it is determined in the step S3 that the engine is not starting cold, the routine proceeds from the step S3 to a step S8, and energizing of the electrical heating substrate 6 is prohibited by resetting this flag EHCSTF to "0".

Figure 2:
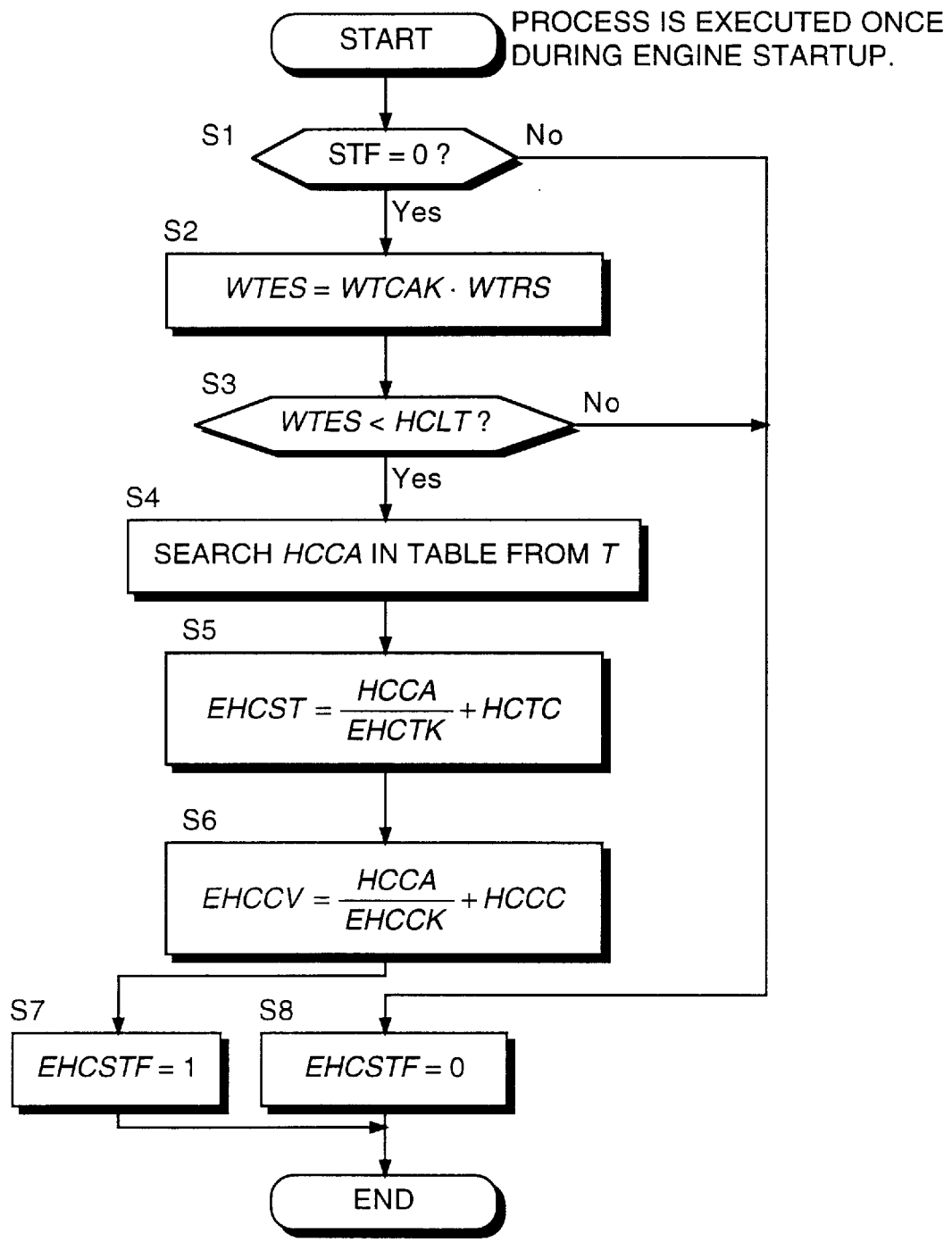
FIG. 2 is a flowchart describing a process for computing a heating start time and supply current performed by a control unit according to the first embodiment of this invention.
Figure 3:
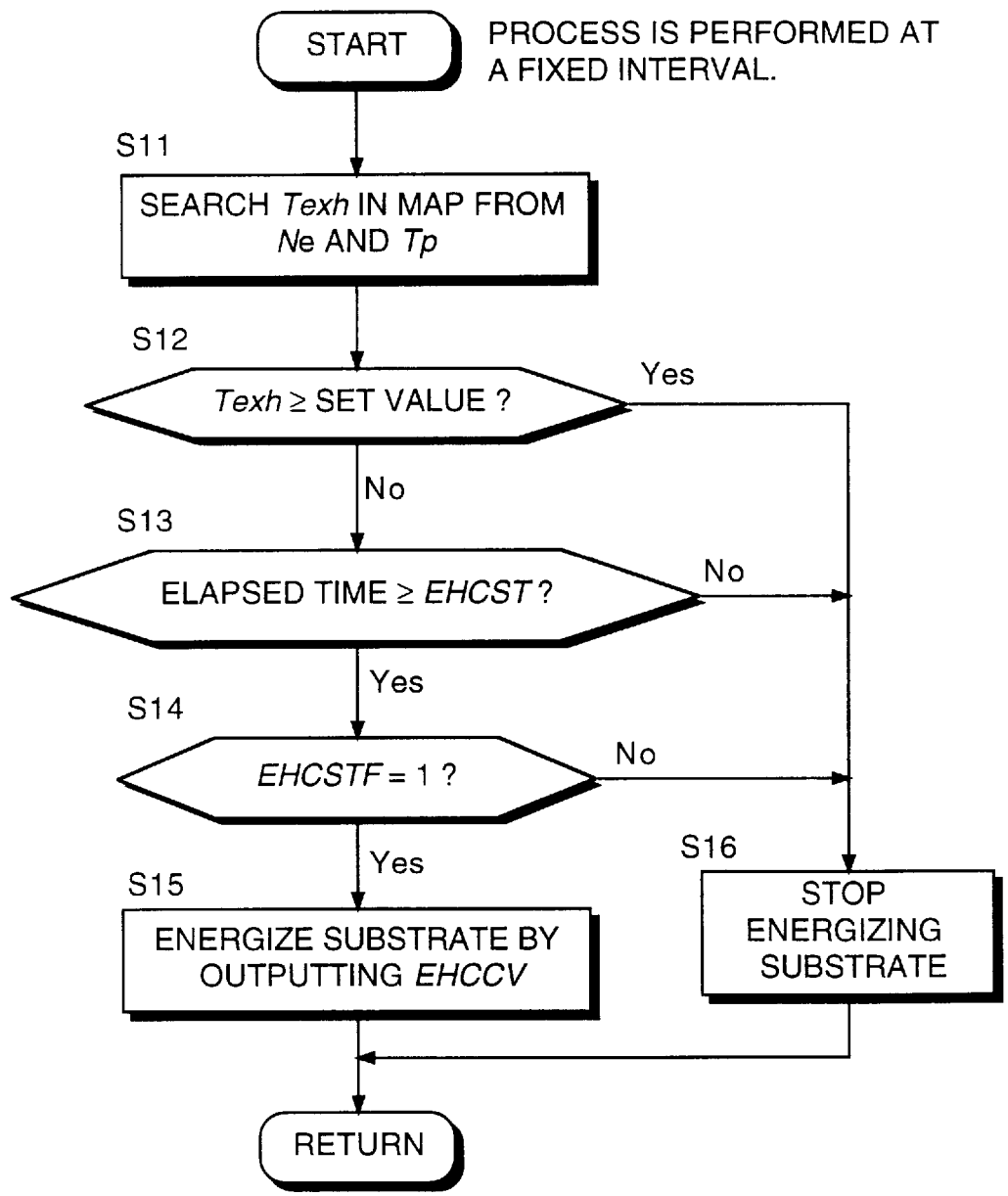
FIG. 3 is a flowchart describing a power supply control process performed by the control unit.

The flowchart of FIG. 3 shows a process for controlling energizing of the electrical heating substrate 6. This process is performed at a fixed interval after the process shown in the flowchart of FIG. 2 is completed.

In a step S11, an exhaust temperature Texh is found by looking up a predetermined map from the engine rotation speed Ne detected by the rotation speed sensor 14 and a basic injection pulse width Tp computed in air-fuel ratio control, and this exhaust temperature Texh is compared with a predetermined value, e.g., 300° C. in a step S12. The basic injection pulse width Tp is known from air-fuel ratio control, e.g. the aforesaid U.S. Pat. No. 5,529,043. The determination of the exhaust temperature from the engine rotation speed Ne and basic injection pulse width Tp is known from Tokkai Hei 7-247829 published by the Japanese Patent Office in 1995.

When the exhaust temperature Texh is less than the predetermined value in the step S12, it is determined that the first three-way catalyst 4 is not yet active, and the routine proceeds to a step S13.

In the step S13, an elapsed time from engine startup and the energizing time EHCST obtained in the process of FIG. 2 are compared. The control unit 11 is therefore provided with a timer function which is invoked by the starter switch 12.

When the elapsed time EHCST from engine startup is equal to or longer than EHCST, it is determined in a step S14 whether or not the flag EHCSTF=1.

When the flag EHCSTF=1, the routine proceeds to a step S15, and energizing of the electrical heating substrate 6 is performed. This is done by transferring the current value EHCCV obtained in the process of FIG. 2 to an output register in the control unit 11. As a result of this transfer, a heater current control mechanism operates so that the current supplied to the substrate 6 from a fixed voltage circuit coincides with this current value EHCCV.

When on the other hand the exhaust temperature Texh is equal to or greater than the predetermined value, or when the elapsed time is less than EHCST even if the exhaust temperature Texh is less than the predetermined value in the step S13, or when the flag EHCSTF=0 in the step S14, energizing of the substrate 6 is stopped in a step S16.

As a result of this control, heating of the exhaust by the electrical heating substrate 6 starts immediately before the temperature of the HC adsorbent 3 exceeds 90° C. after a cold start of the engine 10. Activation of the first three-way catalyst 4 is thereby promoted, and the time from when HC begin to be discharged by the HC adsorbent 3 to when the first three-way catalyst 4 oxidizes them is considerably shortened. Emission of HC to the atmosphere immediately after a cold start is thereby decreased. It should also be noted that the heating of the exhaust also shortens the time required for the activation of the second three-way catalyst 5.

Further, as the energizing start time EHCST of the electrical heating substrate 6 is arranged to be directly proportional to the adsorption capacity HCCA of the HC adsorbent 3, the heating start time of the substrate 6 is further delayed the larger the adsorption capacity HCCA, and therefore unnecessary power consumption is avoided. Also as the current supplied to the substrate 6 is not a constant value and is made to vary in direct proportion to the adsorption capacity HCCA, the current flowing in the substrate 6 is smaller the lower the adsorption capacity HCCA. When the adsorption capacity HCCA is low, the HC adsorption amount is small, so the amount of HC discharged by the HC adsorbent 3 due to temperature rise of the adsorbent is also small. At the same time, heating of the exhaust by the heater 6 starts early. It is therefore unnecessary to activate the first three-way catalyst 4 so rapidly, and power is economized by supplying a small current to the substrate 6.

According to this invention, the adsorption capacity HCCA which is the basis for calculating the heating start time and heating current is a value which varies depending on the inlet temperature T of the HC adsorbent 3.

Hence, the heating start time of the substrate 6 and the current supplied to the substrate 6 may be precisely controlled even when the inlet temperature T of the HC adsorbent is different.

Next, a second embodiment of this invention is explained with reference to FIG. 4 and a third embodiment of this invention is explained with reference to FIG. 5.

According to the second embodiment, the converter containing the electrical heating substrate 6 is disposed immediately upstream of the catalytic converter 13 comprising the HC adsorbent 3 and first three-way catalyst 4, and the second three-way catalytic converter 16 which comprises a second three-way catalyst 21 is disposed downstream from the converter 13.

According to the third embodiment, the functions of both the HC adsorbent 3 and three-way catalyst 4 are provided by one catalyst, i.e. an HC adsorbent 22 is given the functions of a three-way catalyst. The HC adsorbent 22 may alternatively be given oxidizing catalyst functions.

The HC adsorbents 3 and 22 of these two embodiments are slightly different from the HC adsorbent 3 of the first embodiment.

(1) HC adsorbent 3 according to the second embodiment 50 weight parts of USY zeolite containing $SiO_2/Al_2O_3$ in a mole ratio of 50, 50 parts of ZSM-5 zeolite containing $SiO_2/Al_2O_3$ in a mole ratio of 700, 65 parts of silica gel containing 20% solids and 65 parts of water were introduced in a ball mill and crushed for 6.5 hours so as to make a slurry. The slurry obtained was coated on a monolithic honeycomb substrate of 400-cell per square inch and 1.3 liter in volume, and after drying, was precalcinated in air at 400° C. for 1 hour.

The slurry was applied in 3 stages. First, 60 g/liter was applied as a post-precalcination amount. Two similar applications were made so that the total of each post-precalcination amount was 150 g/liter.

After the above process, final calcination was performed at 650° C. for 4 hours.

(2) HC adsorbent 22 having a three-way catalyst function according to the third embodiment 100 weight parts of USY zeolite containing $SiO_2/Al_2O_3$ in a mole ratio of 50, 65 parts of silica gel containing 20% solids and 65 parts of water were introduced in a ball mill and crushed for 6.5 hours so as to make a slurry.

The slurry obtained was coated on a monolithic honeycomb substrate of 400-cell per square inch and 1.3 liter in volume, and after drying, was precalcinated in air at 400° C. for 1 hour.

The slurry was applied in 3 stages. First, 60 g/liter was applied as a post-precalcination amount. Two similar applications were made so that the total of each post-precalcination amount was 150 g/liter.

After the above process, final calcination was performed at 650° C. for 4 hours.

A Pt/Rh three-way catalyst layer was then applied on this coating layer so that the application amount was 100 g/liter having the functions of a three-way catalyst which oxidizes HC, and reduces carbon monoxide (CO) and nitrogen oxides (NOx).

Figure 6:
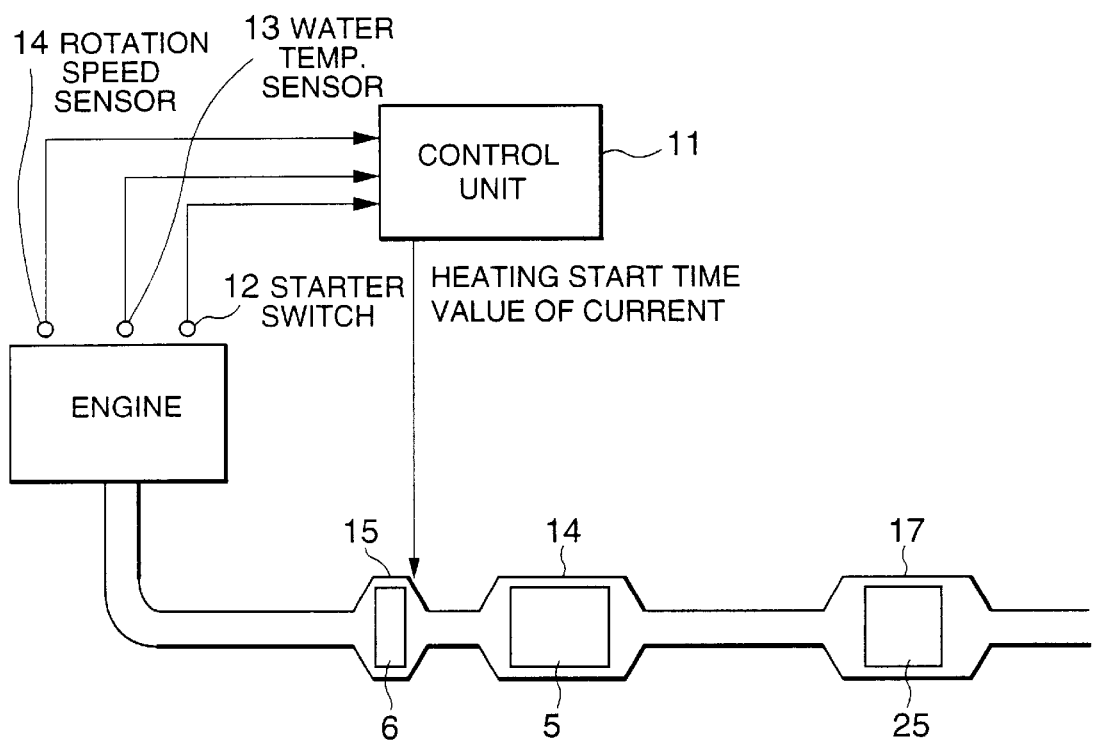
FIG. 6 is a schematic diagram of an exhaust purifier not using the HC adsorbent set by the inventors for purposes of comparison with the aforesaid embodiments of the invention.

FIG. 6 shows an exhaust purifier constructed by the inventor only for the purpose of comparison with the aforesaid three embodiments. In this purifier, the exhaust purifier HC adsorbent 3 of the first embodiment is removed, and the catalytic capacity of a three-way catalyst 25 provided in a converter 17 downstream of the converter 14 is increased by the same capacity as that of the HC adsorbent 3 which was removed. In this case, the three-way catalytic converter 17 may also comprise two catalysts in series so as to give the same catalytic capacity overall. The inventors of this invention performed experiments to evaluate the performance of this exhaust purifier and the purifiers of the aforesaid three embodiments in purifying HC discharged on engine startup. The emission reduction factor from 0 to 125 seconds after engine startup was measured according to the method specified in North American emission test mode FTP75 A-bag, and the results are shown below. The exhaust gas composition used for evaluating performance was aromatics 44.4%, paraffins 33.3% and olefins 22.3%.

| Case | Specification | HC reduction factor |
| --- | --- | --- |
| Embodiment 1 | electrical heating substrate + three-way catalyst + (adsorbent + three-way catalyst) | 82% |
| Embodiment 2 | electrical heating substrate + (adsorbent + three-way catalyst) + (three-way catalyst) | 78% |
| Embodiment 3 | electrical heating substrate + adsorbent (with three-way catalyst function) + three-way catalyst | 84% |
| Comparison device | electrical heating substrate + three-way catalyst + three-way catalyst | 60% |

The HC reduction factor of the first embodiment is better than that of the second embodiment.

This difference is probably due to the effect of the second three-way catalyst 5 as described hereinabove, i.e. to the delay in temperature rise of the HC adsorbent during a cold start so that HC is adsorbed for a relatively long time. The second embodiment lacks the three-way catalyst between the HC adsorbent 3 and the electrical heating substrate 6.

Figure 4:
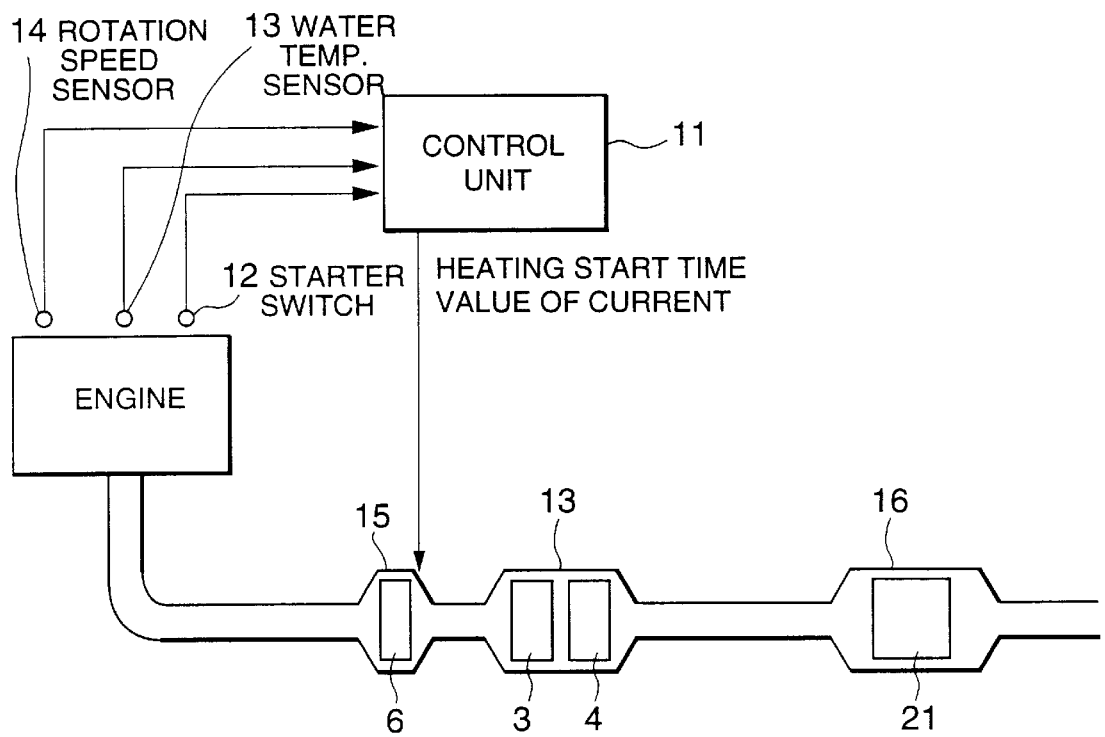
FIG. 4 is a schematic diagram of an exhaust purifier according to a second embodiment of this invention.
Figure 5:
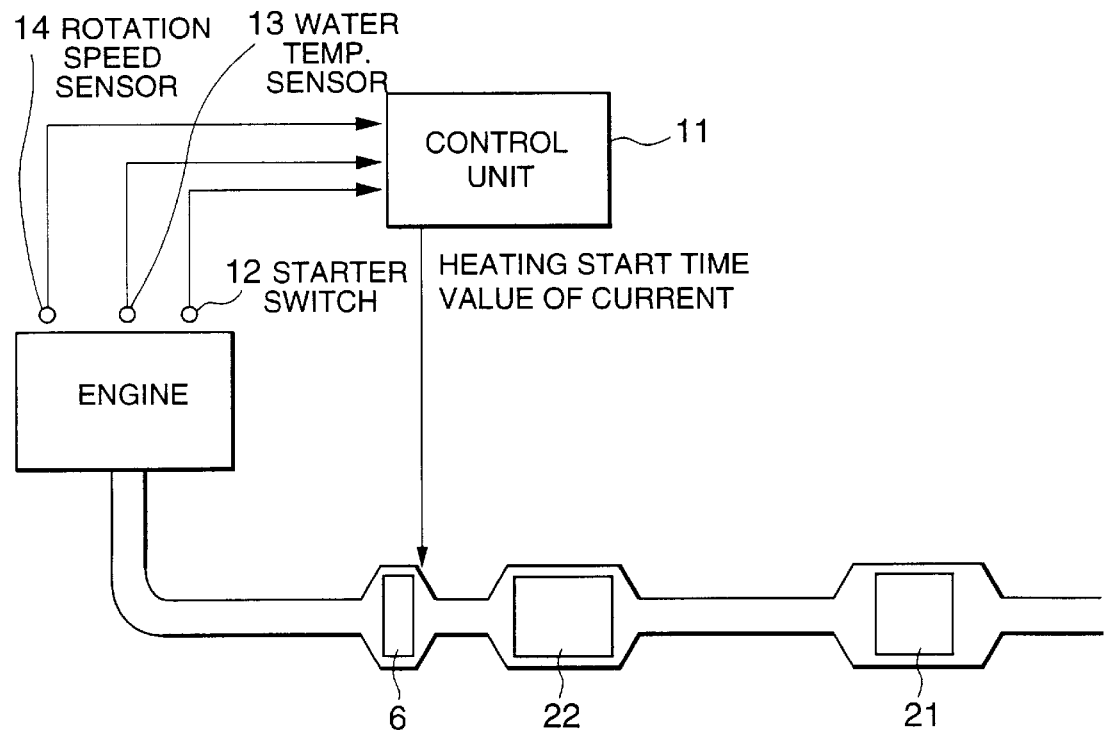
FIG. 5 is a schematic diagram of an exhaust purifier according to a third embodiment of this invention

Also the reason why the HC reduction factor of the third embodiment is better than that of the second embodiment is probably due to the fact that the temperature rise of the part of the HC adsorbent 22 having a three-way catalyst function shown in FIG. 5 is earlier than the temperature rise of the three-way catalyst 4 of FIG. 4.

According to the aforesaid embodiments, the HC adsorbent may contain a zeolite such as USY, ZSM-5 or a zeolite having Si/2Al in a high mole ratio such as for example mordenite or beta-zeolite, or it may be an adsorbent in which a metal such as palladium (Pd), copper (Cu) or cobalt (Co) is supported on these zeolites.

Further, instead of the electrical heating substrate 6, a heater which generates heat for example by irradiating with electromagnetic waves, such as is disclosed in tokkai hei 5-168950 published by the Japanese patent office in 1993, maybe used.

The embodiments of this invention in which an exclusive property or privilege is claimed are defined as follows:

1. An exhaust purifier provided in an exhaust passage of an engine for purifying exhaust gas from the engine, comprising:

an adsorbent disposed in said exhaust passage which absorbs hydrocarbons from the exhaust gas in a predetermined temperature region and discharges adsorbed hydrocarbons at a temperature higher than said temperature region, said adsorbent having an inlet;

a catalyst disposed in said exhaust passage downstream from said adsorbent, said catalyst oxidizing hydrocarbons at a temperature higher than said temperature region;

an electric heater for heating exhaust in said exhaust passage according to a power supply, said heater being disposed in said exhaust passage upstream from said adsorbent; and a microprocessor programmed to:
determine a temperature at said inlet of said adsorbent;
calculate an adsorption capacity of said adsorbent from said temperature at said inlet;
determine a timing at which power supply to said heater is started based on the adsorption capacity; and
start power supply to said heater at said timing.

2. An exhaust purifier as defined in claim 1, wherein said microprocessor is further programmed to determine a current value of power supply to said heater based on the adsorption capacity and supply a current corresponding to the determined current value to said heater.

3. An exhaust purifier as defined in claim 1 further comprising an additional catalyst disposed in said exhaust passage between said electric heater and said adsorbent, said additional catalyst oxidizing hydrocarbons at a temperature higher than said temperature region.

4. An exhaust purifier as defined in claim 1, further comprising a additional catalyst disposed in said exhaust passage downstream from said catalyst, said additional catalyst oxidizing hydrocarbons in a predetermined high temperature region higher than said temperature region.

5. An exhaust purifier as defined in claim 1, wherein said microprocessor is programmed to vary an output of said electric heater according to a supplied current and thereby vary an amount of heat generated.

6. An exhaust purifier as defined in claim 1, wherein said microprocessor is further programmed to estimate said inlet temperature from a cooling water temperature of the engine.

7. An exhaust purifier as defined in claim 1, wherein said electric heater comprises a honeycomb structure formed by laminating alternate layers of flat and corrugated thin metal band, and electrodes disposed in a center and on an outer circumference of said structure.

8. An exhaust purifier as defined in claim 1, wherein said adsorbent comprises a honeycomb substrate coated with a slurry having zeolite powder.

9. An exhaust purifier provided in an exhaust passage of an engine for purifying exhaust gas from the engine, comprising:

an adsorbent disposed in said exhaust passage which absorbs hydrocarbons from the exhaust gas in a predetermined temperature region and discharges adsorbed hydrocarbons at a temperature higher than said temperature region, said adsorbent having an inlet and a catalyst for oxidizing hydrocarbons at a temperature higher than said temperature region;

an electric heater for heating exhaust in said exhaust passage according to a power supply, said heater being disposed in said exhaust passage upstream from said adsorbent; and a microprocessor programmed to:
determine a temperature at said inlet of said adsorbent;
calculate an adsorption capacity of said adsorbent from said temperature at said inlet;
determine a timing at which power supply to said heater is started based on the adsorption capacity; and
start power supply to said heater at said timing.

10. An exhaust purifier as defined in claim 9, wherein said microprocessor is further programmed to determine a current value of power supply to said heater based on the adsorption capacity and supply a current corresponding to the determined current value to said heater.

11. An exhaust purifier as defined in claim 9, further comprising an additional catalyst disposed in said exhaust passage between said electric heater and said adsorbent, said additional catalyst oxidizing hydrocarbons at a temperature higher than said temperature region.

12. An exhaust purifier as defined in claim 9, further comprising an additional catalyst disposed in said exhaust passage downstream form said adsorbent, said additional catalyst oxidizing hydrocarbons at a temperature higher than said temperature region.

13. An exhaust purifier as defined in claim 9, wherein said microprocessor is programmed to vary an output of said electric heater according to a supplied current and thereby vary an amount of heat generated.

14. An exhaust purifier as defined in claim 9, wherein said microprocessor is further programmed to estimate said inlet temperature from cooling water temperature of the engine.

15. An exhaust purifier as defined in claim 9, wherein said electric heater comprises a honeycomb structure formed by laminating alternate layers of flat and corrugated thin metal band, and electrodes disposed in a center and on an outer circumference of said structure.

16. An exhaust purifier as defined in claim 9, wherein said adsorbent comprises a honeycomb type substrate coated with a slurry having zeolite powder.

* * * * *